UNITED STATES PATENT OFFICE.

GUILLIAM H. CLAMER, OF PHILADELPHIA, PENNSYLVANIA.

ELIMINATION OF METALS.

970,686.

Specification of Letters Patent. Patented Sept. 20, 1910.

No Drawing.

Application filed October 19, 1904. Serial No. 229,101.

*To all whom it may concern:*

Be it known that I, GUILLIAM H. CLAMER, a citizen of the United States, and resident of Philadelphia, in the county of Philadelphia and State of Pennsylvania, have invented certain new and useful Improvements in Elimination of Metals, of which the following is a specification.

Commercial brass scrap consists essentially of copper but contains tin, lead, zinc, iron, manganese and aluminum, with or without other metals and impurities, and in some instances some of the metals mentioned are absent. It is obviously desirable to use brass scrap, for the production of alloys and the like specially constituted for various purposes, but it frequently occurs that some of the ingredients of the scrap would prevent its use for certain of such specially constituted alloys.

I have already patented in and by United States Letters Patent No. 707,551, a method for treating brass scrap so as to eliminate its undesirable constituents. That patented method, stated generally, consists in replacing a part of the copper alloy or brass scrap by fusing it along with a flux and a chemical metallic compound of which the heat of formation is less than that of the part or parts to be eliminated from the scrap, so that the chemical compound is reduced and its base enters into the alloy, replacing the part or parts thereof to be eliminated, such part or parts entering into the chemical compound and being taken up by the slag.

In the commercial application of that patented process it is necessary to use the chemical metallic compound or oxidizing material in such a way that an excess of it is present or else it is necessary to know the precise analysis of the various alloys involved.

It is one object of the present invention to obviate the use of the oxidizing material in excess and to dispense with the necessity for such knowledge as can only be acquired by analysis, or in other words, to improve and simplify the attainment of the results accomplished by the patented process.

Another object of the invention is to facilitate the application of the patented process to the preparation from ordinary brass scrap of such an alloy as is well adapted for use as a bearing metal.

Other objects of the invention as well as its nature, characteristic features and scope will appear from the following description:

The process of the present invention may be practiced by melting in a suitable flux the scrap or alloy in contact with an oxid, sulfid or chlorid of a metal whose heat of formation is less than that of the metal or metals desired to be eliminated, employing, however, an insufficient amount of the oxid, sulfid or chlorid (which may be called the oxidizing material) for completing the reaction, so that the metallic base of the oxidizing material is replaced by only a portion of the metal or metals of the alloy and the reduced metal enters into the alloy, but there is left in the molten mass also that portion of the metals which it is desired to eliminate, which has not entered into combination by reason of the absence of sufficient oxidizing material. In other words, the reaction is not complete, and only a portion of the metal or metals which are to be eliminated has entered into the slag. The remaining mixture slag is removed and the remaining mixture is exposed to the action of air which first oxidizes the metals having the greatest affinity for oxygen, thus forming oxids of finity for oxygen, thus forming oxids of them which float on the top of the molten bath and are removed therefrom. These easily oxidizable metals are the metals to be eliminated and they may carry with them a certain quantity of the other constituents of the alloy. When this occurs the constituents last referred to may be secured from the slag, for example, in the manner hereinafter set forth. If the brass scrap or alloy contains the metal or metals to be eliminated in comparatively small proportion, the use of the oxidizing agent may be dispensed with and the necessary oxidation effected by means of air and the removal effected by skimming as described.

For the sake of a further description an explanation will now be given of the treatment according to the invention of ordinary brass scrap containing copper, zinc, lead, tin, iron, manganese and aluminum for the purposes of eliminating substantially everything except copper, tin, and lead. For this purpose the process is conducted as described in my former patent, except that the brass scrap is heated along with a suitable flux, as silica and lime or silica and soda-ash, but in contact with an insufficient quantity of oxid of lead for furnishing enough oxid for oxidizing all the zinc and other metals which are to be eliminated. However, a portion of these are oxidized and pass into the slag which is removed. A current of air is then passed either through or over the molten metal whereby the zinc, iron and other metals which are to be eliminated and which are more electro-positive than either copper, tin or lead are oxidized by the air and float on the surface in the form of dry powder or semi-molten slag. This dry powder or semi-molten slag is skimmed off from time to time, and the metal is exposed if necessary to further oxidation by additional air supplies until the elimination is complete, which fact can be determined by carrying on the oxidation until such time as vapors of zinc are no longer perceptible. The presence or absence of vapors of zinc are conveniently determined by agitating the metal or placing in it an iron rod and withdrawing the same. By these means a thin film of metal is exposed to the air, and zinc, if present, is readily detected by the presence of its characteristic blue flame. If zinc is absent the blue flame of course does not appear. Iron, aluminum and manganese, some of the metals which it is desirable to eliminate, are more easily oxidized than zinc, so that the absence of zinc shows that those other metals have also been eliminated. Thus the zinc re-action affords means for determining optically when the oxidizing process should be stopped so as not to subject the copper, tin and lead to undue oxidation.

It has been stated that some of the metals, which it is not desired to eliminate, are carried into the slag along with those which it is desired to eliminate. However, when this occurs and if it be desired, the slag is treated in a suitable furnace in contact with carbon so that the metals which is contains, more particularly the copper, tin and lead, are reduced to the metallic state and such reduced metals may contain some zinc, and iron, but they may be treated by the above described process so as to eliminate any undesirable metals which they may contain.

To those skilled in the art to which my invention relates modifications may be made in details without departing from the spirit thereof, hence the invention is not limited further than the prior state of the art may require, but

Having thus described the nature and objects of my invention, what I claim as new and desire to secure by Letters Patent is:

1. The method of eliminating and replacing part of a copper alloy which consists in fusing the alloy and a flux and a chemical metallic compound of which the heat of formation is less than the heat of formation of the part to be eliminated with the radical of the compound and of which the base is adapted to replace the part to be eliminated in insufficient quantity for effecting complete elimination, removing the resulting slag, subjecting the fused metallic mass to the action of air whereby the remaining part of the metals to be eliminated are oxidized and form a floating slag, and removing the last mentioned slag, substantially as described.

2. The method of treating an alloy containing copper zinc and metals of which some are electro-positive and some are electro-positive to zinc, which consists in subjecting the fused alloy to the oxidizing action of air, interrupting such oxidizing action when the zinc and the metals electropositive to zinc have been eliminated, removing the slag, and recovering an alloy of copper with metals electro-negative to zinc.

In testimony whereof I have hereunto signed my name.

GUILLIAM H. CLAMER.

Witnesses:
F. P. DOERRING,
N. F. NICKELSON.